US009065363B2

(12) United States Patent
Marioni

(10) Patent No.: US 9,065,363 B2
(45) Date of Patent: Jun. 23, 2015

(54) METHOD FOR STARTING A PERMANENT MAGNET SINGLE-PHASE SYNCHRONOUS ELECTRIC MOTOR AND ELECTRONIC DEVICE FOR IMPLEMENTING SAID METHOD

(75) Inventor: Elio Marioni, Vicenza (IT)

(73) Assignee: Askoll Holding S.r.l. (IT)

( * ) Notice: Subject to any disclaimer, the term of this patent is extended or adjusted under 35 U.S.C. 154(b) by 195 days.

(21) Appl. No.: 13/558,067

(22) Filed: Jul. 25, 2012

(65) Prior Publication Data
US 2013/0026967 A1 Jan. 31, 2013

(30) Foreign Application Priority Data

Jul. 25, 2011 (EP) .................................... 11175224

(51) Int. Cl.
H02P 1/46 (2006.01)
H02P 1/50 (2006.01)
H02P 3/18 (2006.01)
H02P 6/00 (2006.01)
H02P 6/18 (2006.01)
H02P 27/02 (2006.01)

(52) U.S. Cl.
CPC ................ *H02P 6/008* (2013.01); *H02P 1/465* (2013.01); *H02P 6/182* (2013.01); *H02P 27/023* (2013.01)

(58) Field of Classification Search
CPC ...................................................... H02P 1/465
USPC ..................................... 318/721, 690, 400.11
See application file for complete search history.

(56) References Cited

U.S. PATENT DOCUMENTS

| 8,164,286 | B2* | 4/2012 | Marioni .................... 318/400.11 |
| 8,222,856 | B2* | 7/2012 | Acquaviva et al. ........... 318/721 |
| 2003/0178966 | A1* | 9/2003 | Marioni ......................... 318/690 |
| 2007/0122289 | A1 | 5/2007 | Marioni | |
| 2010/0201303 | A1 | 8/2010 | Acquaviva | |
| 2011/0157942 | A1* | 6/2011 | Babcock et al. .............. 363/126 |

FOREIGN PATENT DOCUMENTS

| DE | 19546145 A1 | 6/1996 |
| EP | 0945973 A2 | 9/1999 |

OTHER PUBLICATIONS

European Search Report issued in connection with EP 10 42 5330, May 4, 2012.

* cited by examiner

Primary Examiner — Erick Glass
(74) Attorney, Agent, or Firm — Akerman LLP

(57) ABSTRACT

A method for starting a permanent magnet single-phase synchronous electric motor which includes a permanent magnet rotor and a stator with windings, and which is connected to an electrical grid by a switch. The method includes: a first starting attempt in which the windings are fed in current with first starting impulses generated only during the half-periods of a first polarity of the voltage of the electrical grid; a first control step which detects whether a starting condition has been obtained in the first starting attempt; and, if the first control step does not detect that the starting condition has been obtained within the term of the first starting attempt, a second starting attempt in which the windings are fed in current with second starting impulses generated only during the half-periods of a second polarity that is opposite to the first polarity of the voltage of the electrical grid.

15 Claims, 9 Drawing Sheets

METHOD FOR STARTING A PERMANENT MAGNET SINGLE-PHASE SYNCHRONOUS ELECTRIC MOTOR AND ELECTRONIC DEVICE FOR IMPLEMENTING SAID METHOD

FIELD OF APPLICATION

The present invention refers, in its most general aspect, to a method for starting a single-phase permanent magnet synchronous electric motor, as well as to an electronic device able to be associated with an electric motor to implement said starting method.

In particular, the method concerns the starting of single-phase synchronous electric motors used in applications characterised by a great need to reduce cost and bulk. For example, it concerns the starting of electric motors used in domestic appliances such as washing machines and dishwashers.

PRIOR ART

As known, synchronous motors, whilst benefiting from a high energy efficiency and excellent stability of the operating speed, have a substantial drawback linked to their difficulty in starting.

Indeed, during the starting step the rotor must be brought from zero speed to a condition of frequency coupling with the power supply source of the machine. In practice, in order to allow said frequency coupling, mechanical and/or electronic technical provisions are adopted, which of course involve a substantial production and installation cost.

When on the one hand mechanical adaptations, also when extensively applied, lead to problems of efficiency and noise, on the other hand electronic systems generally have higher costs but greater dependency.

In particular the electronic circuits consisting of inverter and chopper, which would allow the frequency and the wave amplitude of the grid voltage to be easily varied, changing them during the starting step, are excessively burdensome and unsuitable for the control of low power single-phase synchronous motors that are preferentially employed in electrical appliances for reasons of their low costs.

Starting methods are therefore adopted that are based on low cost circuitry, employing for instance a switch to transform the alternate current that powers the motor phase in a starting impulse ramp of the same sign intended to start the initial rotation of the rotor.

In a solution of this type it is however necessary to know the initial position of the rotor in order to determine which sign should be attributed to the starting impulses. Indeed, the rotor of a single-phase synchronous permanent magnet motor can occupy two different rest positions, separated by a half-turn in typical cases of 2-pole machines; in a first position the rotor is incited by negative current impulses, in the opposite position by positive current impulses.

The rotor's initial position can be determined by means of a position sensor, e.g. by a Hall effect sensor that reads a magnetic field that is defined locally by the rotor magnets. This solution however requires the use of an additional component and is relatively expensive.

A more economical solution that does not require a position sensor, is described in the patent EP 0 945 973. This patent proposes that the above-mentioned starting impulse ramp be preceded by a brief series of alignment impulses of opposite signs, intended to bring the rotor in a predefined starting position. In fact, in cases where a rotor is located in a rest position that is different from the predefined starting position, the impulses will make it rotate; in the opposite case they will not have any effect. The subsequent starting ramp therefore determines the starting on the basis of this predefined position.

In order for the method described in EP 0 945 973 to function correctly it is necessary that the number and amplitude of the impulses are determined with great precision so that they produce the desired rotation of the rotor (180° in the typical case of a 2-pole machine). In actual applications various factors of uncertainty intervene, for instance unforeseen load variations or fluctuations in electrical grid voltage that form an also substantial deviation from the project parameters. As a result of this deviation cases occur in which the alignment impulses do not fulfil their purpose: either because their intensity is insufficiently high to push the rotor to the predefined position or, on the contrary, because their intensity is too high and the rotor overshoots the predefined position to return to the original one. Both circumstances imply a false starting of the motor.

The technical problem forming the basis of the present invention is, therefore, to devise a starting method and a respective electronic device for its implementation that allow the starting of permanent magnet single-phase synchronous motors with low production and installation costs, while at the same time eliminating the problem of the false start observed with the method proposed in EP 0 945 973.

SUMMARY OF THE INVENTION

The aforementioned technical problem is solved by a method for starting a single-phase synchronous electric motor comprising a permanent magnet rotor and a stator provided with windings connected to an electrical grid by means of a switch.

Such a method comprises the following steps:

a first starting attempt in which the windings are fed in current with one or more first starting impulses that are generated only during the half-periods of a first polarity of the voltage of the electrical grid;

a first control step in which it is detected whether a starting condition has been obtained in the course of the first starting attempt;

in case said first control step does not detect that the starting condition has been obtained within the term of the first starting attempt, a second starting attempt in which the windings are fed in current with one or more second starting impulses that are generated only during the half-periods of a second polarity, the opposite of the first polarity, of the voltage of the electrical grid;

The control logic described above, also able to be actuated in sensorless mode with low-cost components, allows simple and effective starting of a single-phase synchronous electric motor.

In fact, the two consecutive starting attempts ensure that the rotor is started in either of the possible rest positions, without the need for a position sensor to be present to detect the position in which the rotor finds itself.

Furthermore the absence of the critical step of the alignment of the rotor allows false starts due to the incorrect calibration of the alignment impulses, to be avoided.

The starting condition whose obtainment is detected in the course of the first control step can be advantageously represented by the exceeding of a control threshold by a counter electromotive force signal.

The counter electromotive force signal can easily be obtained without the help of sensors, for example as the difference between the electrical grid voltage and the voltage across the switch in the periods in which the current fed to the windings is zero. The zero current condition can be evaluated by making sure that the voltage across the switch is sufficiently different from zero, or else through a shunt resistance.

One will note that since the starting attempts are predisposed to overcome the pulling back of the cogging torque, the counter electromotive force threshold is chosen in such a way that it establishes in a subsequent transitional phase the synchronous operation (with the specific control logic described later) within a rotation angle of the rotor that is equal to the angle subtended between two successive interpolar axes of the stator. In the specific case of a single-phase motor with two poles, the control logic is thus initiated within the first 180° of rotation of the rotor.

In particular it can advantageously be established that the control logic will be implemented when the counter electromotive force exceeds a threshold of between 10% and 20% of the value of the counter electromotive force peak at operational speed.

In the above-mentioned method the first starting impulses are preferably a plurality, and the first control step can include in this case the detection of whether the starting condition has been reached following each starting impulse.

In this manner one can quickly interrupt the progression of impulses, switching to a control mode that is more suited for the kinematic state of the rotor in the successive transition phase.

The first starting impulses and the second starting impulses can be a plurality of impulses of progressively increasing intensity (modulated for instance through phase control) to define a ramp that counters the cogging torque in the first starting phase of the rotor.

It is preferable that the method comprises a waiting step that divides the first starting attempt from the second starting attempt, said waiting step being of sufficient length to ensure the stabilization of the rotor.

In fact, even if the first starting attempt acts on the rotor oriented in a such a way that it cannot be started by the polarity of the employed impulses, these can still cause oscillations around the rest position that are best left to die down before the next starting attempt.

Moreover the first starting impulses must be configured in number and intensity in such a manner that they start the rotor overcoming the cogging torque if the rotor finds itself in a first rest position, but without changing the position of the rotor if it finds itself in a second rest position.

The method can advantageously comprise a second control step in which the possible obtainment of the starting conditions is detected in the course of the second starting attempt. The step of application of the control logic of the electric motor until a synchronous state is obtained is therefore activated upon the detection of the starting condition by the first or the second control step.

This control logic can employ two conditions for switching on aimed at ensuring that the current circulating in the windings is mainly (i.e. most of the time) of the same sign as the counter electromotive force generated by the electric motor.

Hereafter we shall briefly explain why such a sign ensures good starting of the electric motor.

The driving torque $C_M$ developed instantaneously by the current in the windings is given by the product:

$$C_M = -i(t) \cdot \Phi \cdot \sin(\theta(t))$$

where $\Phi$ is the peak value of the flow induced by the magnet in the windings and $\theta$ is the angular displacement of the rotor.

On the other hand, the counter electromotive force is:

$$fcem = -\Phi \omega_m \cdot \sin(\theta(t))$$

hence:

$$C_M \omega_m = fcem \cdot i(t)$$

In order to obtain a torque value CM in accordance with the rotation speed $\omega_m$, i.e, to ensure a driving torque and not a braking torque during starting, it is thus necessary as stated above for the current circulating in the windings to be of the same sign as the counter electromotive force.

The first condition for switching on the switch is verified when a detected counter electromotive force signal has the same sign as an electrical grid voltage signal, whereas a second condition is verified when said counter electromotive force signal has the same sign as its first derivative value.

Moreover, given that the control logic described above controls just the conditions for switching on the switch, for its implementation the switch used can be a simple TRIAC switch, which interrupts the electrical connection at the moment when the current passes through zero.

A more elaborate control logic, comprising a condition for switching off the switch when there is a difference in sign between current and counter electromotive force, would on the other hand require a switch such as to allow the interruption of the current, as well as suitable circuits to absorb the energy dissipated in the inductance of the stator windings. Such a logic would also require the acquisition of the current signal and the estimation of the counter electromotive force, through the implementation of complex circuits, also in the moments when current circulates in the windings.

Actually, however, the second condition of the control logic according to the present invention prevents situations with stator current that is different from the counter electromotive force, making the switched off condition of the switch superfluous and substantially simplifying the control architecture and its implementation.

The verification of said first condition can easily be implemented by applying an XNOR logic operation to a squared signal of the counter electromotive force and to a grid synchronisation signal.

The second condition can also be easily verified by applying an XNOR logic operation to a squared signal of the counter electromotive force and to a squared signal of the first derivative of the counter electromotive force.

Alternatively, the first and the second condition can be simultaneously verified by applying an XNOR logic operation between the grid synchronisation signal and a second squared signal, obtained from the sum between the counter electromotive force signal and the signal of its first derivative suitably scaled.

Since the first derivative of the counter electromotive force is in advance of this, the squared sum of the two signals is also in advance of the squared signal of just the counter electromotive force; said advance increases with the scale factor attributed to the first derivative; the threshold squaring value also makes it possible to delay the rising edge and bring forward the falling edge; with just two parameters it is thus possible to set the range in which the switched on condition is allowed, according to the requirements of the situation (moment of inertia, hydraulic-mechanical load, risk of demagnetisation . . . ).

The switching on of the switch can be brought forward with respect to the occurrence of the first condition of the control logic, and it is possible for the switch to be switched on slightly in advance of the moment when the counter electromotive force changes sign going to take up the same sign as the grid voltage.

Such a solution is possible considering the link of the torque with the sine of position angle of the rotor and the delay of the current signal with respect to the voltage signal in the ohmic-inductive circuit represented by the stator windings. All the while the position angle is opposite, the braking torque is negligible. The switching on in advance does however provide the circuit with more time to allow the current to grow, so as to exploit said current when the sine of the position angle has become broadly the same.

In order to avoid the second condition inhibiting the switching on of the switch in the case of local slowing down due to the cogging torque or to the load of the motor, it is possible to relax the aforementioned second condition allowing the switch to be switched on even when, although the counter electromotive force signal has taken up a different sign to its first derivative value, the peak value of the counter electromotive force signal coinciding with the last variation in sign of its first derivative has a modules below a threshold value.

The second condition of the control logic indeed wants to inhibit the switching on of the switch when the rotor pole is approaching the stator pole, a situation that preludes a change in sign of the counter electromotive force.

The aforementioned local slowing down can however cause a negative first derivative of the signal without said critical condition necessarily occurring. Such a circumstance can however be recognised from the fact that the absolute value of the counter electromotive force peak, prior to the occurrence of the slowing down itself, takes up low values, normally less than 20% of the counter electromotive force peak at nominal speed. This is why if said value does not reach a certain threshold, the control logic can advantageously provide the switching on of the TRIAC switch contravening the previous indications.

The aforementioned technical problem is also solved by an electronic device for starting a synchronous motor comprising a processing unit, a switch for feeding said synchronous motor controlled by said processing unit, said processing unit receiving a grid voltage signal and a voltage signal across the switch, said electronic device being arranged to implement the method described above. As stated earlier, the switch can be a switch of the TRIAC type.

Further characteristics and advantages of the present invention will become clear from the following description of a preferred embodiment, given for indicating and not limiting purposes with reference to the attached drawings.

DETAILED DESCRIPTION

Figure 1:
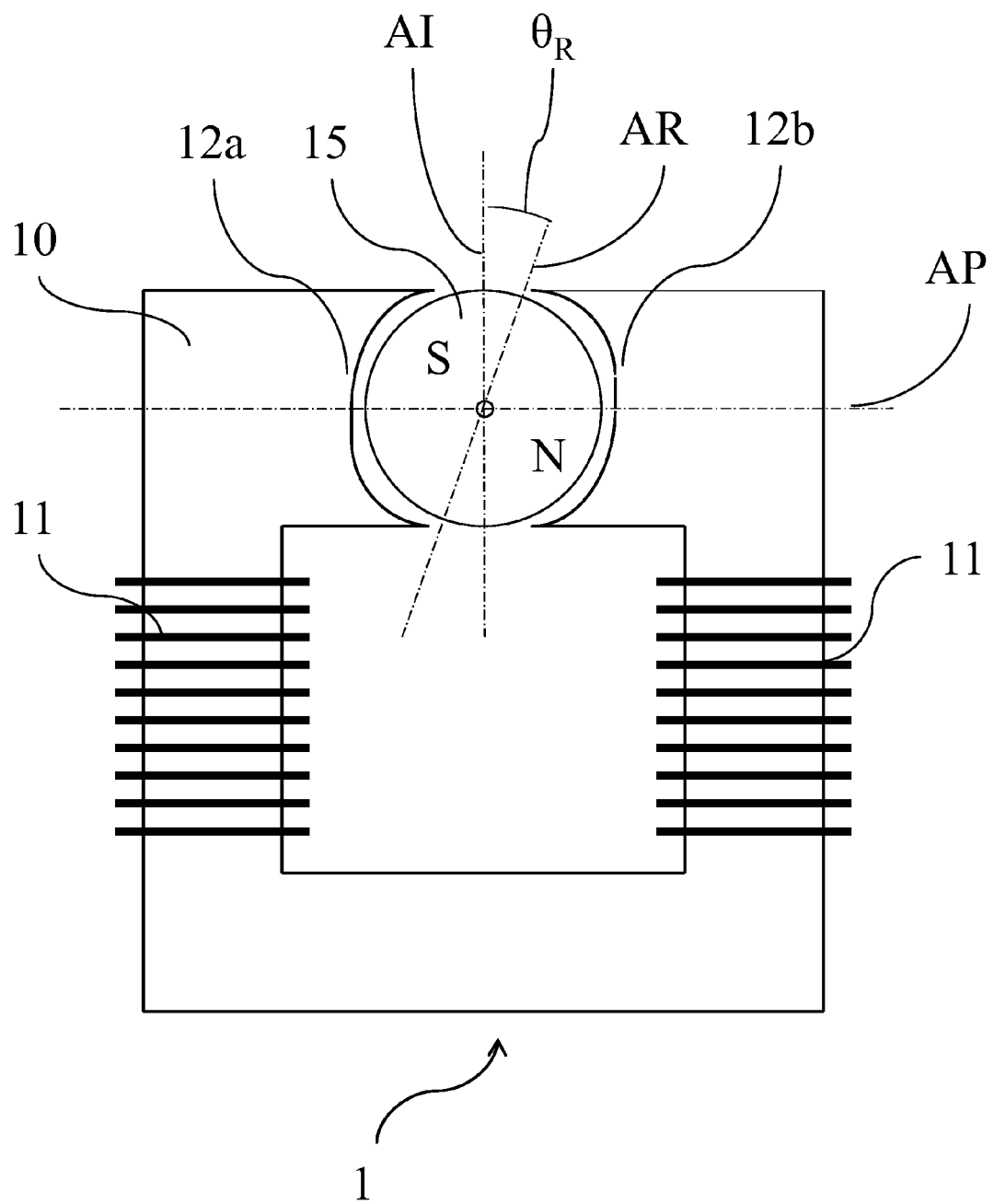
FIG. 1 schematically represents a synchronous electric motor controlled with a starting logic according to the present invention.
Figure 2:
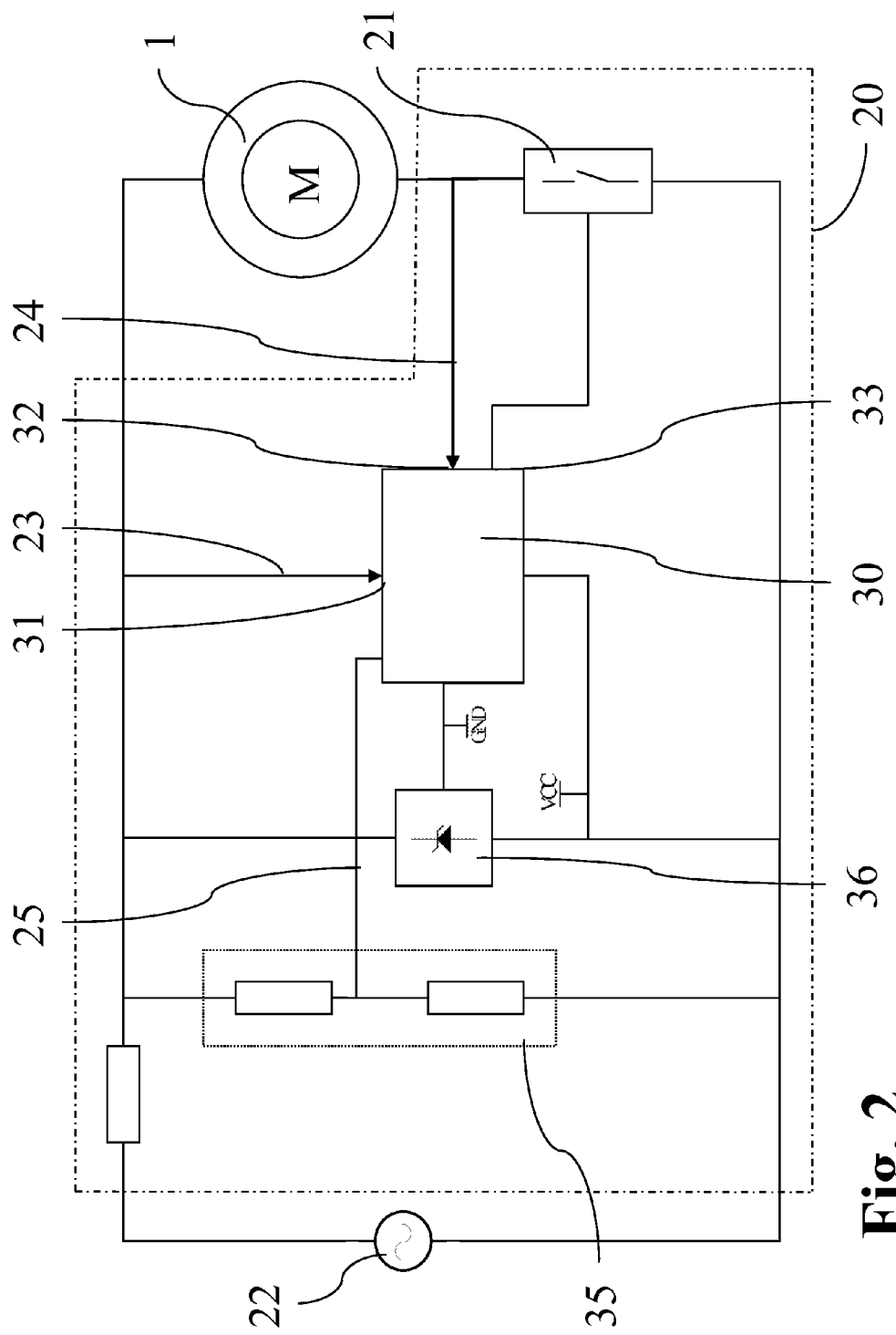
FIG. 2 schematically represents an electronic device according to the present invention applied to the synchronous electric motor of FIG. 1.
Figure 3:
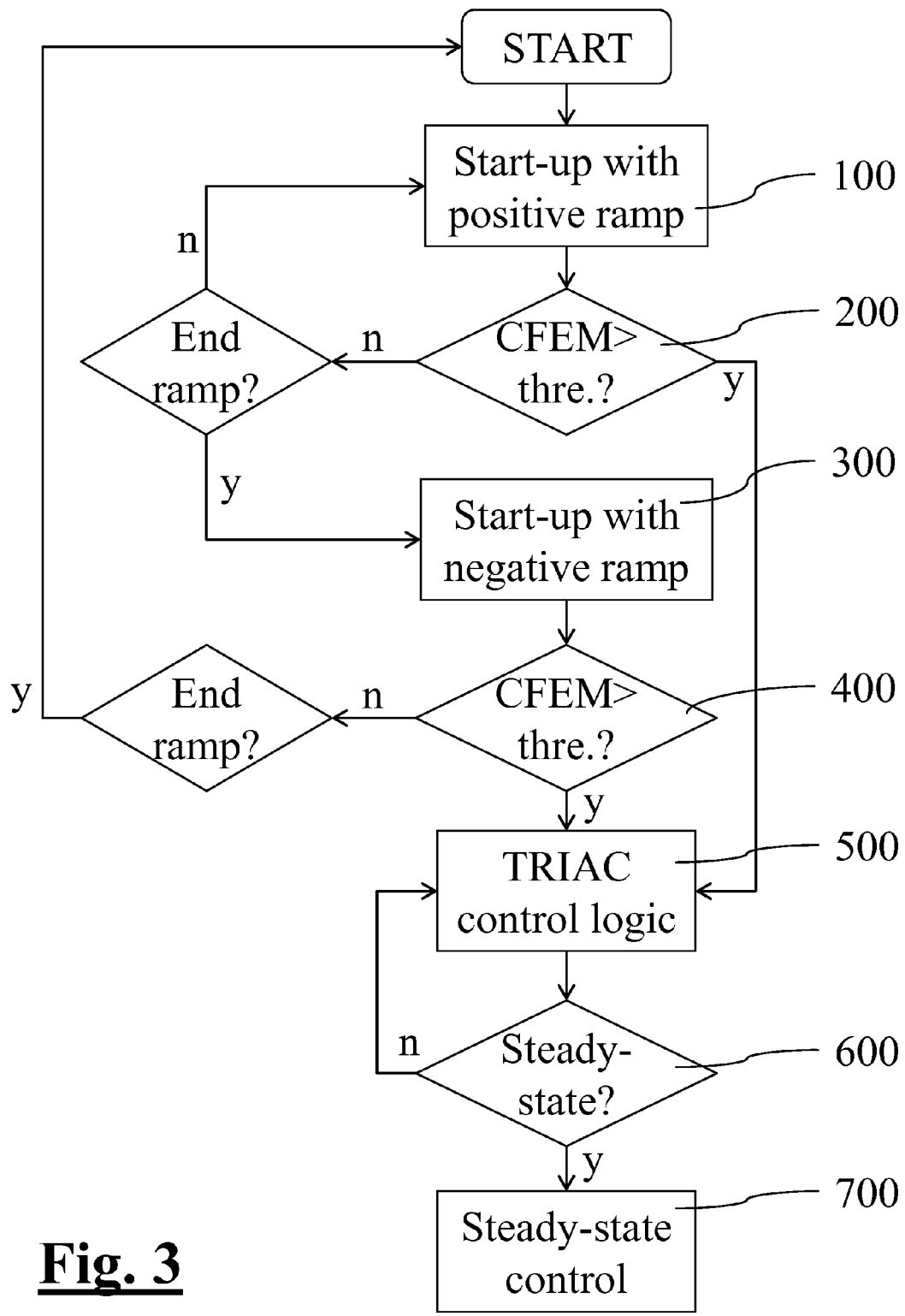
FIG. 3 presents a block diagram that illustrates the various steps of the starting method according to the present invention.

With reference to the attached FIG. 1, reference numeral 1 identifies a permanent magnet single-phase synchronous motor, comprising a stator 10 and a cylindrical rotor 15 able to rotate with respect to it.

The stator 10 defines a magnetic circuit that closes on the rotor 15, rotatably arranged between a first 12a and a second 12b polar expansion of the stator itself. The stator has two windings 11 fed by an electronic device 20.

The rotor 15 comprises a permanent magnet arranged so as to define two diametrically opposite magnetic poles on the outer periphery of the element. With the term rotor axis AR we shall define a diameter of the rotor lying on the ideal plane of separation between the poles thus defined.

The polar expansions 12a, 12b, arranged according to a polar axis AP of the stator 10, are distinguished by a morphological asymmetry, so that the rotor 15 at rest is arranged with rotor axis AR inclined by an angle of asymmetry $\theta_R$ with respect to an interpolar axis AI of the stator 10. Such asymmetry as known ensures the unidirectional starting of the synchronous motor. In the present example the rotor axis AR is inclined by about 6° with respect to the interpolar axis in the anti-clockwise direction, thus promoting a starting of the rotor in the same direction.

The electronic device 20, which preferably takes up the form of a control board, has a static switch 21, in this specific case a TRIAC switch, arranged to adjust the power supply to the stator windings 11, supplied by an electrical grid 22 in alternating current.

The TRIAC switch 21 is connected to a PWM output 33 of a processing unit 30, which preferably takes up the form of a microprocessor. Said processing unit 30 implements the method for starting the synchronous motor 1 described hereafter.

The processing unit 30 has a first input 31, which receives a grid voltage signal 23, and a second input 32, which, on the other hand, receives a voltage signal 24 on the switch.

By processing such signals, the processing unit 30 is able to carry out an indirect measurement of the counter electromotive force generated by the synchronous motor 1, obtained as the difference between the grid voltage signal 23 and the voltage signal 24 on the switch, at the moments when the current is zero. The control unit 30 detects said zero current condition still evaluating the voltage signal 24 on the switch, and in particular ensuring that such a signal is sufficiently far from the zero value.

From the counter electromotive force measurement in the zero current periods, the processing unit 30 can estimate the time profile of said force. It thus generates a squared counter electromotive force signal 26, which takes up the unitary value when the counter electromotive force is positive, otherwise it is zero; and a squared first derivative signal of the counter electromotive force 27, unitary when the function of the counter electromotive force has a positive derivative, otherwise it is zero.

The electronic device 20 also has a portion 35 for the synchronisation with the power supply grid that obtains a grid synchronisation signal 25, i.e. a signal having a unitary value when the voltage of the electrical grid has positive values, zero when it takes up negative values, and sends it to the processing unit 30.

Figure 9:
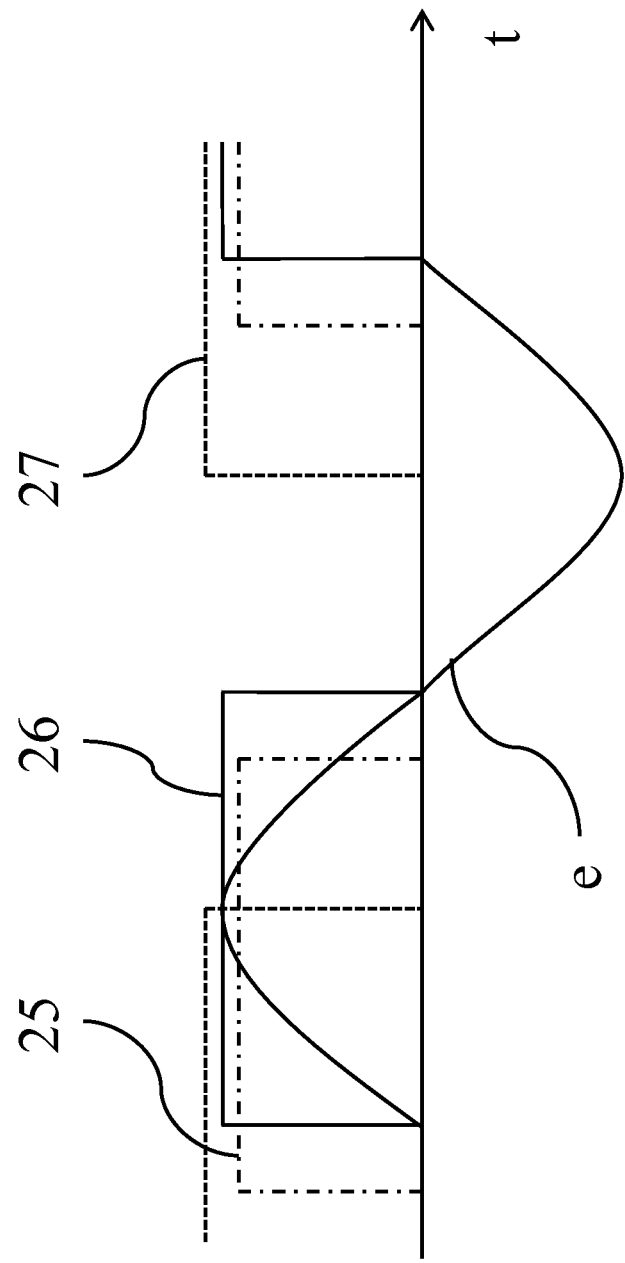
FIG. 9 shows the time profile of some signals used in the starting logic according to the present invention.

The time profile of the grid synchronisation signal 25, of the squared counter electromotive force signal 26 and of the squared gradient signal of the counter electromotive force 27 is schematically represented in comparison with the profile of the counter electromotive force and in FIG. 9.

The electronic device 20 again has a feeding portion 36 of the processing unit 30, also arranged to supply said unit with a voltage reference signal.

In rest conditions, the rotor 15 is arranged with the opposite polarities respectively facing the first 12a and the second polar expansion 12b. There are therefore two possible rest positions given, a first position in which the north pole of the rotor 15 is facing the second polar expansion 12b of the stator 10 and a second position in which that same pole is instead facing the first polar expansion 12a.

A first step of the present method for the starting of the synchronous motor 1 consists of a first starting attempt 100 in the manner described hereafter.

The electronic device 20 controls the TRIAC switch 21 so as to feed the windings 11 with a series of current impulses, here called first starting impulses 50, generated only during a determined half-period, positive in the particular embodiment described here, of the voltage signal of the electrical grid 22. In application, the TRIAC switch must therefore only be switched on when the grid synchronisation signal 23 takes up a positive value.

The first generated starting impulses 50 preferably have increasing intensity, thus defining a positive starting ramp. The intensity is adjusted by means of phase control, varying the initiation angle of the TRIAC switch 21.

If the rotor 15 finds itself in the first rest position described above, the first starting impulses 50 cause a rotation of said rotor, ideally up to an angle of 180°.

Firstly, and in particular in the first $(90+\theta_R)°$ of movement (96° in the embodiment discussed here), the rotor 15 is braked by the cogging force that tends to bring it back towards the starting position. Thus the counter electromotive force, which increases during the starting impulses 50, goes back to zero at the end of every impulse, according to the known formula:

$$fcem = \frac{d\varphi}{dt} = -\Phi\omega_m \sin(\theta(t))$$

where $\varphi$ is the instantaneous flow induced by the magnet in the windings 11, $\Phi$ is the peak value of such a flow, $\omega_m$ is the rotation speed of the rotor and $\theta$ is the angular displacement of the rotor.

The cogging force reaches its maximum value at a rotor angle of $(45+\theta_R)°$, where $\theta_R$ is the angle that the rotor takes up at rest (with zero current), whereas the torque due to just the effect of the current increases with sinusoidal profile up to 90°, and therefore beyond a certain angle the current impulse is such as to overcome the pulling back of the cogging force and the counter electromotive force substantially increases going to exceed a control threshold, indicatively equal to 10-20% of its maximum value in normal operation.

The electronic device 20, between one starting impulse 50 and the next, thus monitors, in a first control step 200, the profile of the counter electromotive force signal; if and when said signal exceeds the control threshold, the electronic device 30 interrupts the series of impulses and passes to a control logic 500 of the motor described hereafter.

Figure 4:
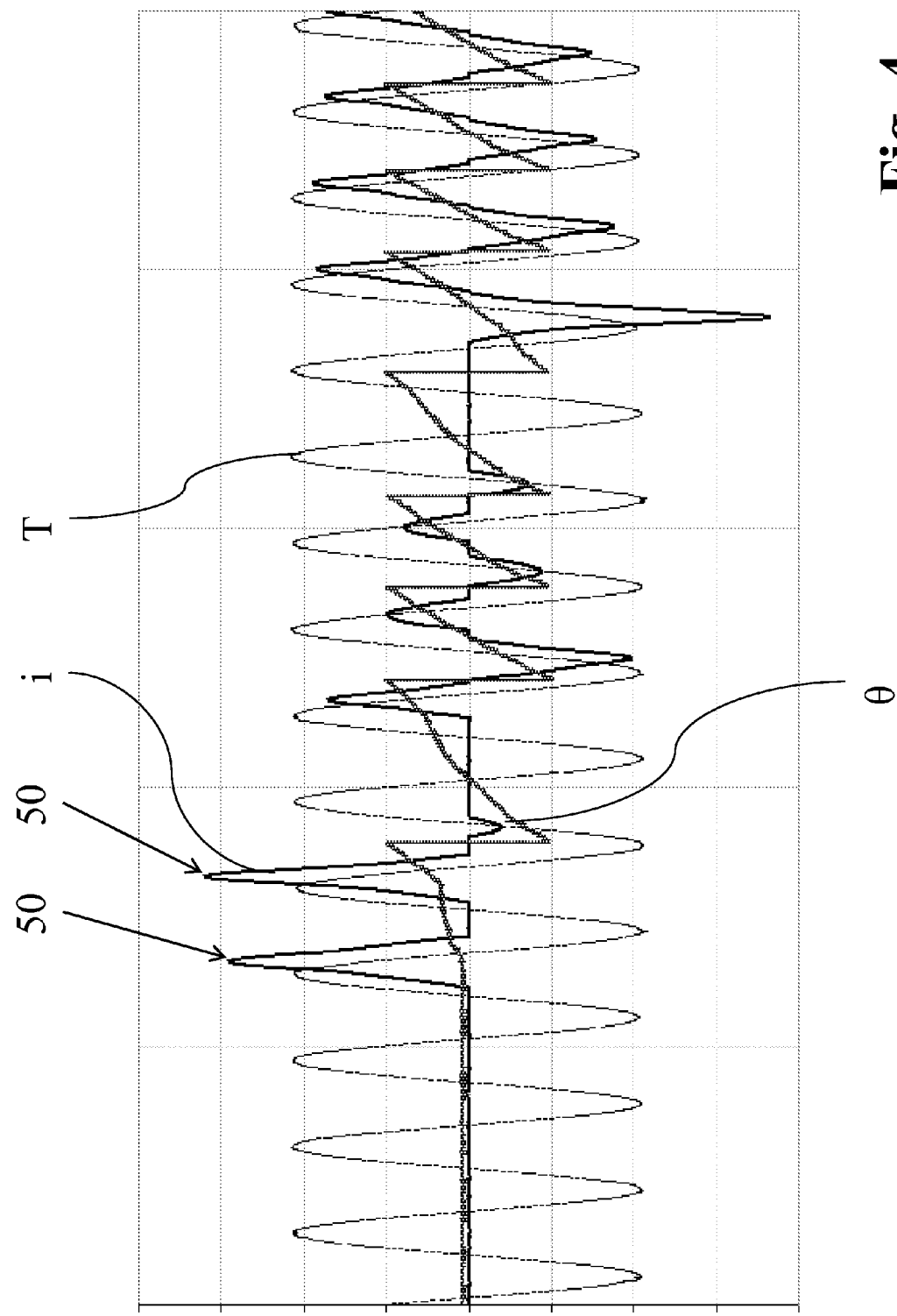
FIG. 4 shows the time profile of some parameters relative to the synchronous motor of FIG. 1 during a first step of the starting method according to the present invention.

The first case described above, in which the rotor 15 finds itself in the first rest position and is made to rotate in the course of the first starting attempt 100, is illustrated in the graph of FIG. 4, representing the profiles of the current i, of the grid voltage T and of the rotation angle of the rotor θ.

If however the rotor 15 finds itself in the second rest position described above, the first starting impulses 50 have a relatively negligible effect on it, provoking a moderate oscillation of the same around the rest position. It should be noted, in fact, that the number and intensity of the first starting impulses 50 are defined in such a manner that they do not provoke excessive oscillations, so that under no circumstances a passage occurs from the second rest position to the first rest position.

In this manner if the rotor 15 finds itself in the second rest position, it does not move in any substantial manner in the course of the first starting attempt 100, the counter electromotive force remains zero and, upon termination of the predefined number of first starting impulses 50 that form the ramp, the control threshold has not been overcome and the electronic device 20 has not activated the control logic 500.

In this case the present method includes a waiting step that allows the oscillations of the rotor 15 around the second rest position to die down.

The waiting time of course depends upon various factors, first of all friction and moment of inertia of the rotor 15. A probable time period for small-sized permanent-magnet synchronous motors is in any case around 700 ms.

Upon conclusion of the waiting step, the method includes a second starting attempt 300 executed in a manner identical to the one of the first attempt, but employing a series of second starting impulses 60, this time generated during the negative half-period of the grid voltage signal 22.

The negative starting ramp created by this, presents the same characteristics as those described above with regard to the positive ramp, with the single obvious exception of the signal's polarity. The characteristics of the negative ramp will not be extensively described for the sake of brevity, it being implied that the description of the positive ramp is also applicable, mutatis mutandis, to the negative ramp.

Also in this case, completely identical to what is described with reference to the positive ramp, the electronic device 20, between one starting impulse 60 and the next, monitors the profile of the counter electromotive force signal (second control step 400) in order to detect the exceeding of the control threshold that determines the passage to the control logic 500.

Given that a rotor 15 positioned in the first rest position would have started during the first starting attempt 100, it should be presumed that the rotor 15 finds itself in the second rest position and that the counter electromotive force exceeds the control threshold during the second starting attempt 300.

Figure 5:
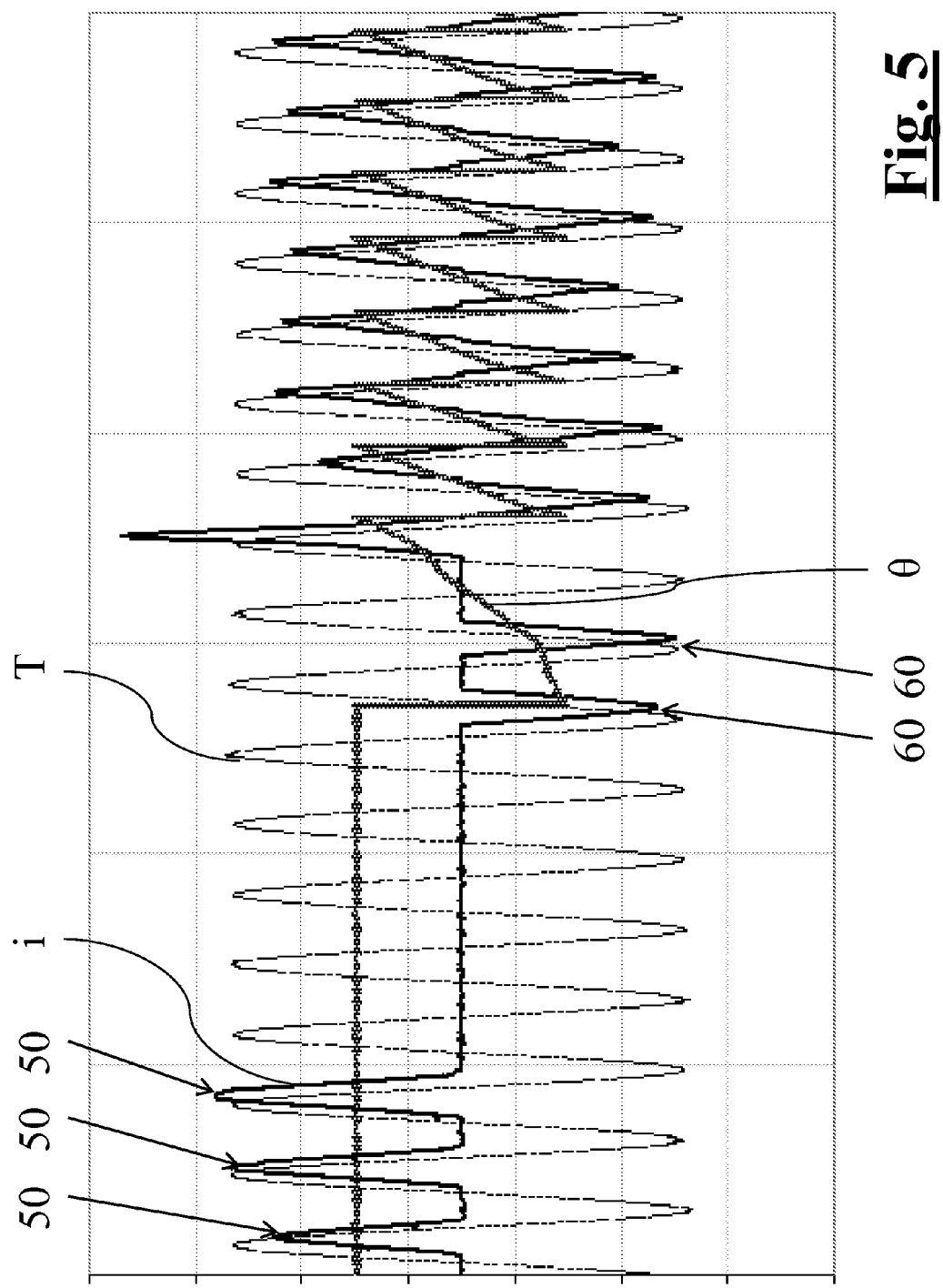
FIG. 5 shows the time profile of some parameters relative to the synchronous motor of FIG. 1 during a first step of the starting method according to the present invention.

The second case described above, in which the rotor 15 finds itself in the second rest condition and is made to rotate during the second starting attempt 300, is illustrated in the graph of FIG. 5, representing the profiles of the current i, of the grid voltage T and of the rotation angle of the rotor θ.

However, if upon termination of the predefined number of the second starting impulses 60 that form the negative ramp, the control threshold of the counter electromotive force has not been reached, the method may include a restart beginning with the first starting attempt 100 or a final stop of the motor, possibly after a series of negative tests and/or a diagnostic step regarding possible damage or malfunction.

If however the electronic device 20 detects that the control threshold for the electromotive force has been exceeded, the method provides the application of a control logic 500 that determines a transition towards normal operation of the electric motor 1.

In this last starting step, the electronic device 20 controls the TRIAC switch 21 allowing it to be switched on only when both of the following conditions occur:

a) the estimated counter electromotive force signal must have the same sign as the grid voltage (first condition);

b) the estimated counter electromotive force signal must be going away from zero (second condition).

The first condition is implemented by the electronic device 20 through an XNOR operation carried out on the grid synchronisation signal 25 and on the squared counter electromotive force signal 26.

The second condition is implemented again through an XNOR operation between the squared counter electromotive force signal 26 and the squared first derivative signal of the counter electromotive force 27. The XNOR operation gives a positive result if the two operators have the same value, i.e. if the sign of the first derivative is the same as that of the function; analytical condition that defines the function going away from zero.

Figure 6:
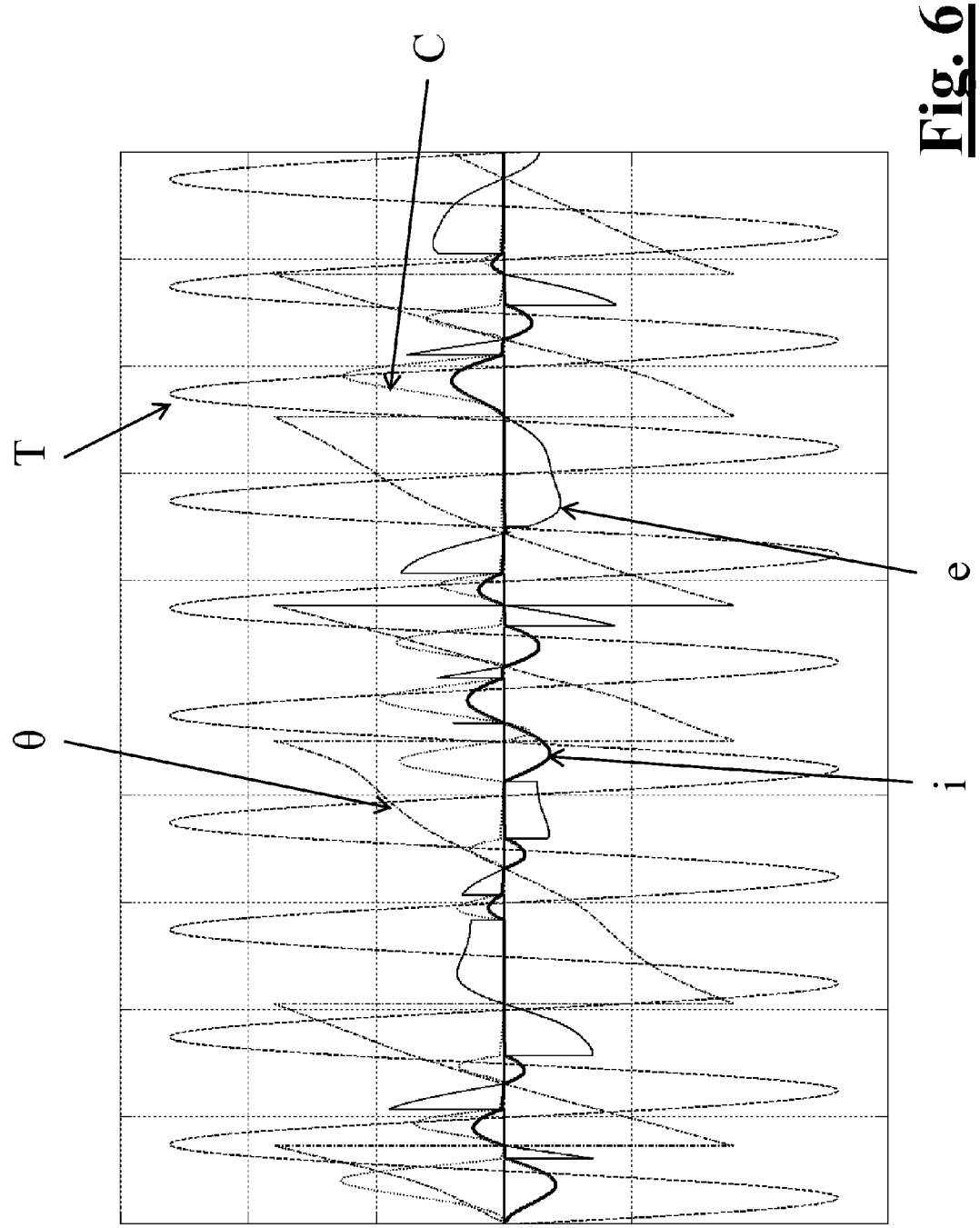
FIG. 6 shows the time profile of some parameters relative to the synchronous motor of FIG. 1 during a second step of the starting method according to the present invention.

FIG. 6 illustrates the time profile of the counter electromotive force e, of the grid voltage T, of the rotation angle of the rotor θ and of the stator current i during the course of the step of application of the described control logic 500.

The aforementioned switching on logic tends to keep the TRIAC switch 21 in conduction only when the transit of current in the windings 11 determines a driving torque in the direction of rotation of the rotor 15, as will become clearer from the considerations formulated hereafter.

The driving torque developed by the stator current is given by the product:

$$C_M = -i(t) \cdot \Phi \cdot \sin(\theta(t))$$

whereas the counter electromotive force is:

$$fcem = -\Phi \omega_m \cdot \sin(\theta(t))$$

hence:

$$C_M \omega_m = fcem \cdot i(t)$$

In order to obtain a driving torque value $C_M$ that is the same as that of $\omega_m$ it is thus necessary for the current circulating in the windings to also be of the same sign as the counter electromotive force.

Based on such a consideration an advantageous control logic of the motor could provide the switching on of the feeding switch when the counter electromotive force and the grid voltage take up the same sign (first condition of the switching on logic actually implemented), and its switching off when counter electromotive force and current take up different signs. If the switch used allows the current to be switched off almost instantaneously, such a control logic develops a driving torque oriented in the direction of rotation of the rotor 15, i.e. never braking.

On the other hand, however, such a control logic, which we shall call switching on/off logic to distinguish it from just the switching on logic actually implemented, cannot be replicated by the electronic device 30 according to the embodiment described here. Indeed, it does not provide an input for the current signal necessary to detect the switching off condition, and also uses a TRIAC switch 21 that is not able to carry out such switching off adequately.

The just switching on logic actually replaces the control for switching off with the second switching on condition. In this way, the TRIAC switch 21 is not switched on in the case in which the periodic profile of the counter electromotive force has already exceeded its peak, given that in such a case the variable is in the process of changing sign and would soon be different from the current impulse generated by the switching on of the switch. In other words, the second condition a priori avoids the occurrence of the conditions that would lead to switching off according to the switching on/off logic.

Thus, thanks to the second condition, the just switching on logic avoids generating braking torques on the rotor 15 of the synchronous electric motor 1.

It should be noted that the first condition of the just switching on logic can be modified by allowing early switching on of the switch 21 when the counter electromotive force, different from the grid voltage, is in the process of changing sign. In this case, the first condition allows the switching on of the switch 21 when the counter electromotive force signal, even if of different sign to the grid voltage, is approaching the zero value and has an absolute value below a predetermined threshold.

If the permitted advance action is not excessive, the condition does not significantly affect the matching sign between counter electromotive force and current, even considering the fact that the current still has a delay with respect to the grid voltage. In this way the current peak comes earlier facilitating starting.

Figure 8:
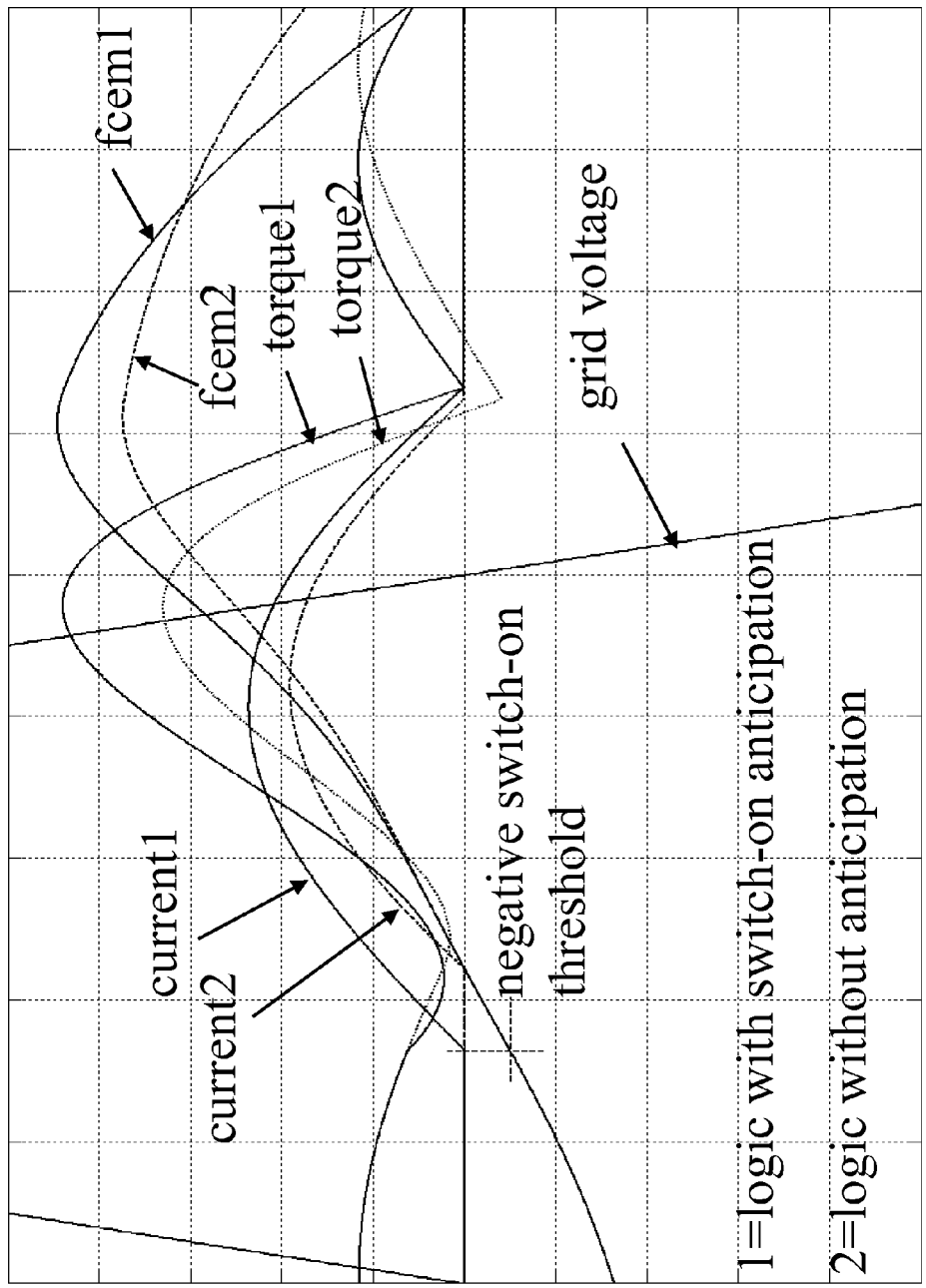
FIG. 8 compares the time profile of some parameters relative to the synchronous motor of FIG. 1 during a second step of two alternative embodiments of the starting method according to the present invention.

FIG. 8 compares the time profile of the counter electromotive force e, of the stator current i and of the torque C during the application of the control logic with or without early starting. The values relative to the early starting are identified by the subscript 1, and those that refer to the non-early starting take the subscript 2.

It should also be noted that the second condition of the just switching on logic can inhibit the switching on of the switch 21 also with slowing down of the rotor 15 that does not correspond to an absolute peak of the counter electromotive force, for example slowing due to cogging torque or to the load on the rotor. In this case the condition proves excessively restrictive given that the current impulse generated would have developed a driving torque on the rotor 15.

Figure 7:
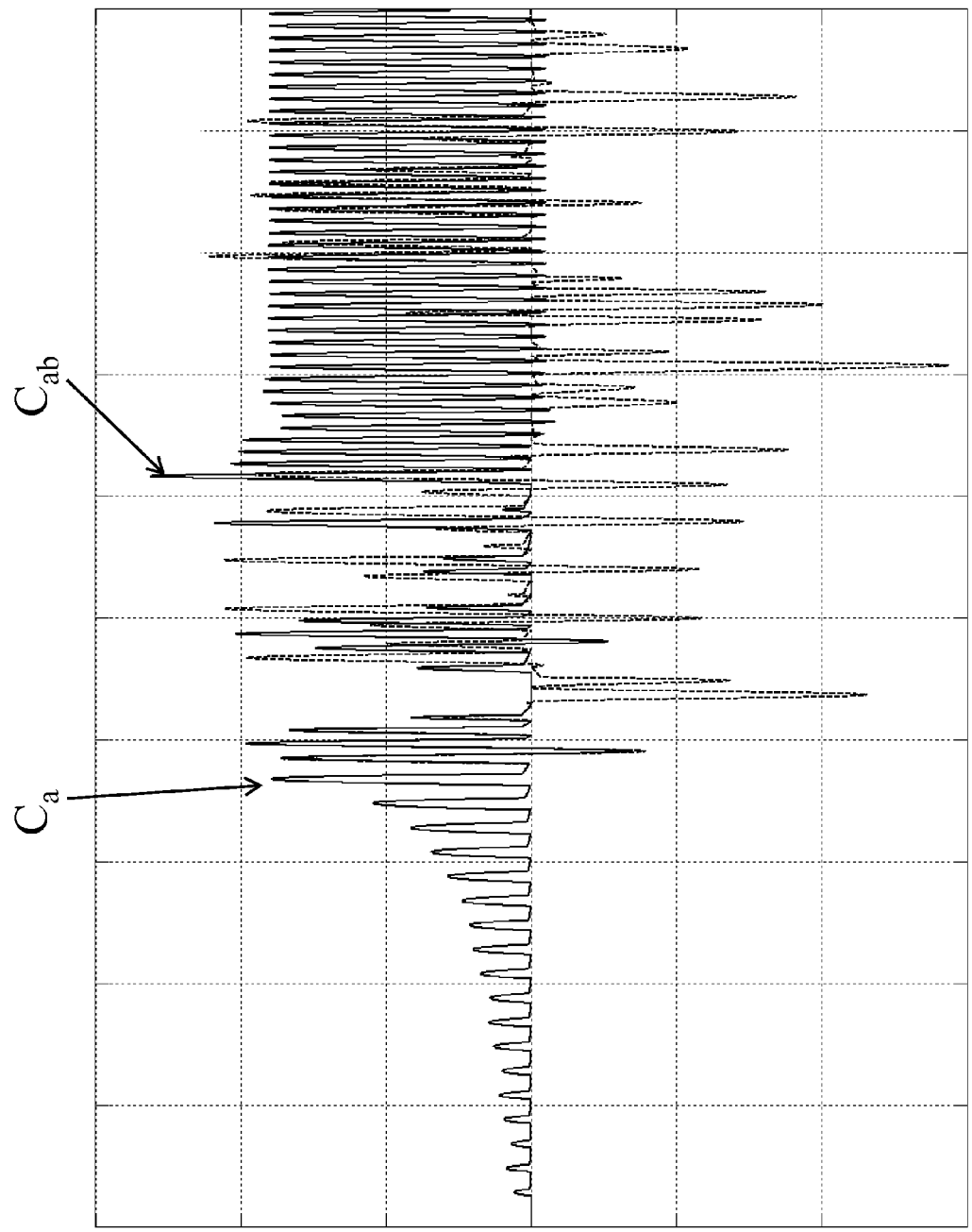
FIG. 7 compares the time profile of the driving torque developed during a second step of two alternative embodiments of the starting method according to the present invention.

The second condition, despite the undesired inhibitions, substantially improves the performance of the motor in starting. Regarding this let us consider FIG. 7, which compares the torque $C_a$ developed applying just the first condition of the switching on logic and the torque $C_{ab}$ developed applying both of the conditions of the logic.

During the application of the control logic 500, by means of measurement of the phase difference between voltage and current it is monitored whether a synchronous state 700 (third control step 600) has been reached. If this phase difference is kept nearly constant for a number of consecutive periods, the synchronous condition 700 is considered to have been reached and the starting of the motor completed.

Of course, a person skilled in the art can bring numerous modifications and variants to the method and to the washing machine described above, in order to satisfy contingent and specific requirements, all of which are covered by the scope of protection of the invention as defined by the following claims.

The invention claimed is:

1. A method for starting a single-phase synchronous electric motor comprising a permanent magnet rotor and a stator provided with windings connected to an electrical grid by means of a switch; said method comprising the following steps:

a first starting attempt in which the windings are fed in current with one or more first starting impulses that are generated only during the half-periods of a first polarity of the voltage of the electrical grid;

a first control step in which it is detected whether a starting condition has been obtained in the course of the first starting attempt;

in case said first control step does not detect that the starting condition has been obtained within the term of the first starting attempt, a second starting attempt in which the windings are fed in current with one or more second starting impulses that are generated only during the half-periods of a second polarity, the opposite of the first polarity, of the voltage of the electrical grid;

wherein the first starting impulses are configured in number and intensity in such a way that they start the rotor overcoming the cogging torque if it finds itself in a first rest position, and in such a way as to not change the position of the rotor if it finds itself in a second rest position.

2. The method according to claim 1, wherein the starting condition whose obtainment is verified during the first control step is the exceeding of a control threshold by a counter electromotive force signal.

3. The method according to claim 2, wherein the counter electromotive force signal is obtained as the difference between the electrical grid voltage and the voltage across the switch in the periods in which the current fed to the windings is zero.

4. The method according to claim 1, wherein the first starting impulses are a plurality, said first control step providing the detection of the possible obtainment of the starting condition following each starting impulse.

5. The method according to claim 1, wherein the first starting impulses and the second starting impulses are a plurality of impulses of progressively increasing intensity.

6. The method according to claim 5, wherein the intensity of the first starting impulses and the second starting impulses is modulated by phase control.

7. The method according to claim 1, comprising a waiting step that divides the first starting attempt and the second starting attempt, said waiting phase having a sufficient length to ensure the stabilization of the rotor.

8. The method according to claim 1, wherein the switch is a TRIAC switch.

9. The method according to claim 1, comprising moreover a second control step wherein it is detected whether the starting condition may have been obtained during the second starting attempt; and a step of application of a control logic of the electric motor up to the state of synchronicity activated upon detection of the starting condition during the first or the second control step.

10. The method according to claim 9, wherein said control logic provides a first and a second condition for switching on the switch, said first and second condition having the purpose of ensuring that, during the application of said control logic, the current circulating in the windings is mainly of the same sign as the counter electromotive force generated by the electric motor; said first condition being verified when a detected counter electromotive force signal has the same sign as an electrical grid voltage signal; said second condition being verified when said counter electromotive force signal has the same sign as its first derivative value.

11. The method according to claim 10, wherein said first condition is verified by applying an XNOR logic operation to a squared signal of the counter electromotive force and to a grid synchronisation signal.

12. The method according to claim 10, wherein said second condition is verified by applying an XNOR logic operation to a squared signal of the counter electromotive force and to a squared signal of the first derivative of the counter electromotive force.

13. The method according to claim 10, wherein the first and the second condition are simultaneously verified by applying an XNOR logic operation to a grid synchronisation signal and to a second squared signal, obtained from the sum between the counter electromotive force signal and the signal of its first derivative suitably scaled.

14. An electronic device for starting a synchronous motor comprising a processing unit, a switch for feeding said synchronous motor controlled by said processing unit, said processing unit receiving a grid voltage signal and a voltage signal across the switch, said electronic device being arranged to implement the method according to claim 1.

15. The method according to claim 1, wherein said first control step is performed after the first starting attempt and before the second starting attempt.

* * * * *